US012745178B2

(12) United States Patent
Hviid et al.

(10) Patent No.: US 12,745,178 B2
(45) Date of Patent: Sep. 22, 2026

(54) WAKE UP SIGNALING SUPPORT IN TELECOMMUNICATION SYSTEMS

(71) Applicant: Nokia Technologies Oy, Espoo (FI)

(72) Inventors: Jan Torst Hviid, Aalborg (DK); Knud Knudsen, Aalborg (DK); Tapio Ilmari Nousiainen, Oulu (FI); Pasi Eino Tapio Kinnunen, Oulu (FI); Jorma Johannes Kaikkonen, Oulu (FI)

(73) Assignee: Nokia Technologies Oy, Espoo (FI)

(*) Notice: Subject to any disclaimer, the term of this patent is extended or adjusted under 35 U.S.C. 154(b) by 299 days.

(21) Appl. No.: 18/484,775

(22) Filed: Oct. 11, 2023

(65) Prior Publication Data

US 2024/0147373 A1 May 2, 2024

(30) Foreign Application Priority Data

Oct. 28, 2022 (FI) ...................................... 20225967

(51) Int. Cl.
*H04W 52/02* (2009.01)

(52) U.S. Cl.
CPC ................................ *H04W 52/0235* (2013.01)

(58) Field of Classification Search
CPC .................................................. H04W 52/0235
See application file for complete search history.

(56) References Cited

U.S. PATENT DOCUMENTS 11,297,574 B2 4/2022 Liao et al.
2018/0310249 A1* 10/2018 Wilhelmsson .... H04W 52/0241
2020/0163017 A1 5/2020 Priyanto et al.
2020/0187120 A1 6/2020 Alanen et al.
2021/0014787 A1 1/2021 Raghavan et al.
2021/0058866 A1 2/2021 Hosseini et al.
2021/0185611 A1 6/2021 Ljung et al.
2021/0329550 A1 10/2021 Astrom et al.
2021/0345244 A1 11/2021 Raghavan et al.
2024/0098644 A1* 3/2024 Ye ..................... H04W 52/0216
2025/0227613 A1* 7/2025 Bastani ............. H04W 52/0219

FOREIGN PATENT DOCUMENTS

WO 2012/021599 A1 2/2012
WO WO-2020029249 A1 * 2/2020 ........ H04W 52/0229
WO 2021/114008 A1 6/2021

(Continued)

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

(Continued)

*Primary Examiner* — James P Duffy
(74) *Attorney, Agent, or Firm* — Barta Jones, PLLC

(57) ABSTRACT

Embodiments of the present disclosure relate to handling wake up signaling. According to example embodiments of the present disclosure, an apparatus comprises at least one processor; and at least one memory including computer program code; the at least one memory and the computer program code are configured to, with the at least one processor, cause the apparatus to perform operations comprising: sending, to a network node, a request for wake-up signal support; and receiving, from a user device, a wake-up signal.

2 Claims, 6 Drawing Sheets

(56) References Cited

FOREIGN PATENT DOCUMENTS

| | | | |
|---|---|---|---|
| WO | 2022/077379 | A1 | 4/2022 |
| WO | 2022/086427 | A1 | 4/2022 |

OTHER PUBLICATIONS

"3rd Generation Partnership Project; Technical Specification Group Radio Access Network; Study on support of reduced capability NR devices (Release 17)", 3GPP TR 38.875, V17.0.0, Mar. 2021, pp. 1-135.
"New SID: Study on low-power Wake-up Signal and Receiver for Nr", 3GPP TSG RAN meeting #94e, RP-213645, Agenda: 8A.1, vivo, Dec. 6-17, 2021, 4 pages.
"Motivation for new study item on ultra-low power wake up signal in Rel-18", 3GPP TSG RAN Rel-18 workshop, RWS-210168, Agenda: 4.3, vivo, Jun. 28-Jul. 2, 2021, 13 pages.
"Msc-generator", Sourceforge, Retrieved on Oct. 20, 2023, Webpage available at : https://sourceforge.net/projects/msc-generator/.
"Revised SID: Study on low-power Wake-up Signal and Receiver for NR", 3GPP TSG RAN meeting #96, RP-221271, Agenda: 9.2.9, vivo, Jun. 6-9, 2022, 4 pages.
"New SID on low-power Wake-up Signal / Receiver", 3GPP TSG RAN meeting #94e, RP-212733, Agenda: 8A.1, Ericsson, Dec. 6-17, 2021, 3 pages.
"IEEE 802.11", Wikipedia, Retrieved on Oct. 3, 2023, Webpage available at : https://en.wikipedia.org/wiki/IEEE_802.11.
Office action received for corresponding Finnish Patent Application No. 20/225,967, dated Mar. 30, 2023, 13 pages.
"L1 signal design and procedure for low power WUS", 3GPP TSG-WG1 Meeting #110-bis-e,9.13.3, Nokia, Oct. 10-19, 2022, 7 pages.
Extended European Search Report received for corresponding European Patent Application No. 23203104.7, dated Mar. 1, 26, 2024, 9 pages.

* cited by examiner

WAKE UP SIGNALING SUPPORT IN TELECOMMUNICATION SYSTEMS

CROSS-REFERENCE TO RELATED APPLICATION

This application claims priority from, and the benefit of, Finland Application No. 20225967, filed Oct. 28, 2022.

TECHNICAL FIELD

Embodiments of the present disclosure generally relate to the field of telecommunication and in particular, to methods, apparatuses and computer readable storage media for handling wake-up signaling.

BACKGROUND

The energy efficiency of user equipment (UEs) is critical to the field of telecommunication. Energy efficiency is even more critical for UEs which have long battery lifetime targets (e.g., weeks, or even years). This includes devices without a continuous energy source, e.g., UEs using small rechargeable and non-rechargeable single coin cell batteries, such as those used for vertical use cases (including sensors and actuators that are deployed extensively for monitoring, measuring, charging, etc.). Generally, their batteries are not rechargeable and expected to last at least few years. Additionally, this also includes wearables such as smartwatches, rings, eHealth related devices, and medical monitoring devices, for which it is challenging to sustain up to one or two weeks, as required, with typical battery capacity.

Some of these UEs (e.g., sensors, actuators, and wearables), not only require a long battery life, but also require latency-critical services (such as sensors for fire detection and extinguishing, to name an example). Therefore, solutions such as extended Discontinuous Reception (DRX) (eDRX) allowing to extend the periodicity by which the UE wakes up to monitor for paging, which in turn reduces the average power consumption, are not applicable as eDRX would lead to unacceptable communication latency.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that handles wake-up signaling. Some example embodiments extend the coverage area of a low power wake-up signal receiver. Some example embodiments ensure a reliable wake-up signal detection in the entire cell area (e.g., 5G legacy paging coverage area). Some example embodiments ensures that user devices in a static or semi-static environment can obtain wake-up signal support.

The objective above is achieved by the features of the independent claims in the appended claims. Further embodiments and examples are apparent from the dependent claims, the detailed description, and the accompanying drawings.

According to a first aspect, an apparatus comprises: at least one processor; and at least one memory including computer program code; the at least one memory and the computer program code are configured to, with the at least one processor, cause the apparatus to perform operations comprising: sending, to a network node, a request for wake-up signal support; and receiving, from a user device, a wake-up signal.

According to an example embodiment of the first aspect, the operations further comprise: checking for a wake-up signal, and based on not detecting any wake-up signal, sending the request for wake-up signal support to the network node.

According to an example embodiment of the first aspect, the operations further comprise: receiving, from the network node, an instruction to search for a wake-up signal beacon on a dedicated wake-up signal transmission band.

According to an example embodiment of the first aspect, the operations further comprise: searching for the wake-up signal beacon on a dedicated wake-up signal transmission band, the wake-up signal beacon indicating a readiness of the user device to provide wake-up signal support.

According to an example embodiment of the first aspect, the operations further comprise: based on detecting the wake-up signal beacon, entering idle mode.

According to an example embodiment of the first aspect, the dedicated frequency band is in an unlicensed spectrum.

According to a second aspect, a method, comprises: sending, to a network node, a request for wake-up signal support; and receiving, from a user device, a wake-up signal.

According to a third aspect, a computer program comprising instructions for causing an apparatus to perform at least the following: sending, to a network node, a request for wake-up signal support; and receiving, from a user device, a wake-up signal.

According to a fourth aspect, an apparatus comprises: at least one processor; and at least one memory including computer program code; the at least one memory and the computer program code are configured to, with the at least one processor, cause the apparatus to perform operations comprising: receiving, from a network node device, a wake-up signal for a user device; and transmitting the wake-up signal to the user device.

According to an example embodiment of the fourth aspect, the operations further comprise: receiving, from the network node device, an instruction to provide wake-up signal support for the user device; and transmitting, to the user device, a wake-up signal beacon, the wake-up signal beacon indicating a readiness of the apparatus to provide wake-up signal support.

According to an example embodiment of the fourth aspect, the operations further comprise: transmitting the wake-up signal beacon on a dedicated frequency band.

According to an example embodiment of the fourth aspect, the dedicated frequency band is in the unlicensed spectrum.

According to a fifth aspect, method comprises: receiving, from a network node device, a wake-up signal for a user device; and transmitting the wake-up signal to the user device.

According to a sixth aspect, a computer program comprises instructions for causing an apparatus to perform at least the following: receiving, from a network node device, a wake-up signal for a user device; and transmitting the wake-up signal to the user device.

According to a seventh aspect, a network node device comprises: at least one processor; and at least one memory including computer program code; the at least one memory and the computer program code are configured to, with the at least one processor, cause the network node device to perform operations comprising: receiving, from a first user device, a request for wake-up signal support; and sending, to the second user device, a wake-up signal to be transmitted to the first user device.

According to an example embodiment of the seventh aspect, the operations further comprise: based on receiving, from the first user device, the request for wake-up signal support, sending, to the second user device, an instruction to provide wake-up signal support to the first user device.

According to an example embodiment of the seventh aspect, sending, to the second user device, the instruction to provide wake-up signal support to the first user device comprises: sending, to the second user device, an instruction to transmit a wake-up signal beacon to the first user device, the wake-up signal beacon indicating a readiness of the second user device to provide wake-up signal support for the first user device.

According to an example embodiment of the seventh aspect, sending, to the second user device, the instruction to transmit the wake-up signal beacon to the first user device comprises: sending, to the second user device, an instruction to transmit the wake-up signal beacon to the first user device on a dedicated frequency band.

According to an example embodiment of the seventh aspect, the dedicated frequency band is in the unlicensed spectrum.

According to an eight aspect, a method, comprises: receiving, from a first user device, a request for wake-up signal support; and sending, to the second user device, a wake-up signal to be transmitted to the first user device.

According to a ninth aspect, a computer program comprising instructions for causing an apparatus to perform at least the following: receiving, from a first user device, a request for wake-up signal support; and sending, to the second user device, a wake-up signal to be transmitted to the first user device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
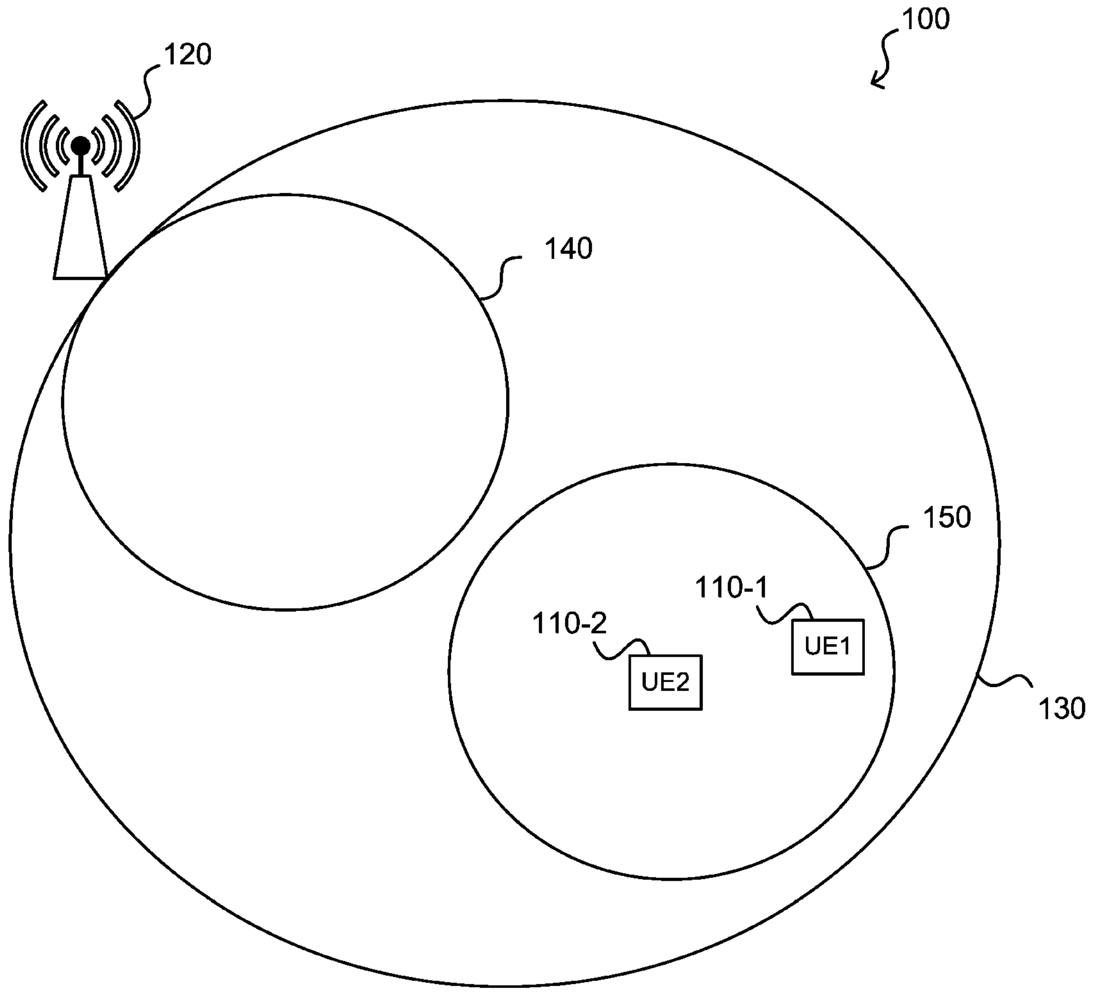
FIG. 1 illustrates an example communication network in which embodiments of the present disclosure may be implemented.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

According to the example embodiments disclosed herein, a user device or client device may refer either to a User Equipment (UE) or any other entity (e.g., Medium Access Control entity) in a wireless communication network. The UE may refer to an electronic computing device that is configured to perform wireless communications. The UE may be implemented as a mobile station, a mobile terminal, a mobile subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some example embodiments, the UE may refer to at least two collocated and inter-connected UEs thus defined.

As used in the example embodiments disclosed herein, a network node may refer to a fixed point of communication/communication node for a user device in a particular wireless communication network. More specifically, the network node may be used to connect the user device to a Data Network (DN) through a Core Network (CN) and may be referred to as a base transceiver station (BTS) in terms of the 2G communication technology, a NodeB in terms of the 3G communication technology, an evolved NodeB (eNodeB or eNB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (e.g., at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (e.g., a home). Correspondingly, the network node serving the macrocell may be referred to as a macro node, the network node serving the microcell may be referred to as a micro node, and so on.

According to the example embodiments disclosed herein, a wireless communication network, in which a user device and a network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

The verb "wake up" and its derivatives used herein relate to a transition of a user device from a sleep state characterized by low power consumption into an active state characterized by high power consumption. The sleep state (herein also referred to as idle mode) may refer to any of RRC_IDLE and RRC_INACTIVE in accordance with the Radio Resource Control (RRC) protocol, or to a DRX mode (i.e., sleep mode). As for the active state, it may refer to any of RRC_CONNECTED and a DRX active mode. The above-mentioned transition results in turning on an ordinary transceiver responsible for performing the baseband processing of an ordinary communication channel between the network node and the user device. The ordinary transceiver may be represented, for example, by a Baseband Unit (BBU) or a baseband processor that relates to an electronic device (ED) or an ED pool in which the baseband processing is carried out. Some examples of the BBU may include, but not limited to, a modem, a front-end processor, a communication controller, or any other similarly functioning device. In general, the BBU is responsible for digital signal processing and may, for example, execute the following functions: digital intermediate frequency (IF) to baseband conversion/digital baseband to IF conversion, modulation/demodulation, constellation mapping/demapping, scrambling/descrambling, and/or encoding/decoding.

As used in the example embodiments disclosed herein, a Wake-Up Signal (WUS) may relate to a wireless signal having encoded thereon instructions for a user device or a set of user devices either to wake up or continue being in the sleep state. Being instructed to be woken up, a user device, i.e., the transceiver included therein, starts processing the ordinary communication channel between the network node and the user device. Correspondingly, the WUS is generated and transmitted by a network node, and then received by the user device. The WUS is only transmitted to page the user device when the network node wants the user device to wake up.

FIG. 1 illustrates a schematic diagram of a communication system 100 in which embodiments of the present disclosure can be implemented. The communication system 100, which is a part of a communication network, comprises a plurality of user devices 110 including a first user devices (e.g., UE1 110-1), and a second user device (e.g., UE2 110-2). The communication system 100 comprises one or more network nodes (including network node 120). It should be understood that the communication system 100 may also comprise other elements which are omitted for the purpose of clarity. It is to be understood that the numbers of devices in FIG. 1 are given for the purpose of illustration without suggesting any limitations. The network node 120 may communicate with the user devices 110-1, 110-2.

In the communication network 100, the user device 110 and the network node 120 can communicate data and control information to each other. Communications in the communication system 100 may be implemented according to any proper communication protocol(s), including, but not limited to, cellular communication protocols of the first generation (1G), the second generation (2G), the third generation (3G), the fourth generation (4G), the fifth generation (5G), the sixth generation (6G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Some of the user devices 110, including the first user device (e.g., UE1 110-1), and the second user device (e.g., UE2 110-2), may be static or semi-static devices. Static devices are devices that are not expected to move. Semi-static devices are device that are not expected to move beyond a certain geographical area. Devices such as Internet-of-Things (IoT) devices, sensors, controllers, or actuators are examples of user devices that may be static or semi-static.

Figure 2:
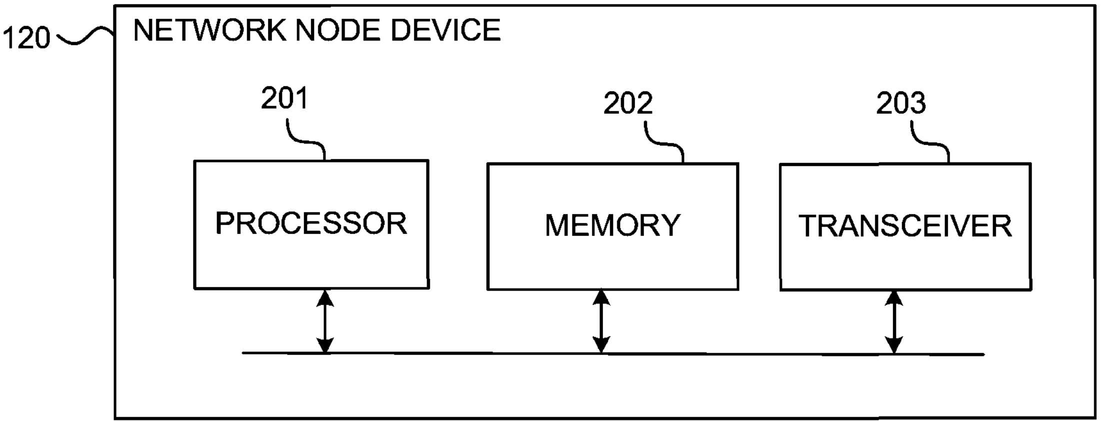
FIG. 2 illustrates simplified block diagrams of a network node device in accordance with one example embodiment.

FIG. 2 is a block diagram of a network node device 120 configured in accordance with an example embodiment.

The network node device 120 may comprises one or more processors 201 and one or more memories 202 that comprise computer program code. The network node device 120 may also comprise at least one transceiver 203, as well as other elements, such as an input/output module, and/or a communication interface.

Although the network node device 120 may be depicted to comprise only one processor 201, the network node device 120 may comprise more processors. In an example embodiment, the memory 202 is capable of storing instructions, such as an operating system and/or various applications.

Furthermore, the processor 201 may be capable of executing the stored instructions. In an example embodiment, the processor 201 may be embodied as a multi-core processor, a single core processor, or a combination of one or more multi-core processors and one or more single core processors. For ex-ample, the processor 201 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 201 may be configured to execute hard-coded functionality. In an example embodiment, the processor 201 is embodied as an executor of software instructions, wherein the instructions may specifically configure the processor 201 to perform the algorithms and/or operations described herein when the instructions are executed.

The memory 202 may be embodied as one or more volatile memory devices, one or more non-volatile memory devices, and/or a combination of one or more volatile memory devices and non-volatile memory devices. For example, the memory 202 may be embodied as semiconductor memories (such as mask ROM, PROM (programmable ROM), EPROM (erasable PROM), flash ROM, RAM (random access memory), etc.).

The network node device 120 may be embodied in, for example, a base station (BS). The base station may comprise, for example, a gNodeB (gNB) or any such device providing an air interface for user devices to connect to the wireless network via wireless transmissions.

When the network node device 120 is configured to implement some functionality, some component and/or components of the network node device 120, such as the at least one processor 201 and/or the memory 202, may be configured to implement this functionality. Furthermore, when the at least one processor 201 is configured to implement some functionality, this functionality may be implemented using program code comprised, for example, in the memory 202. For example, if the network node device 120 is configured to perform an operation, the at least one memory 202 and the computer program code can be configured to, with the at least one processor 201, cause the network node device 120 to per-form that operation.

Figure 3:
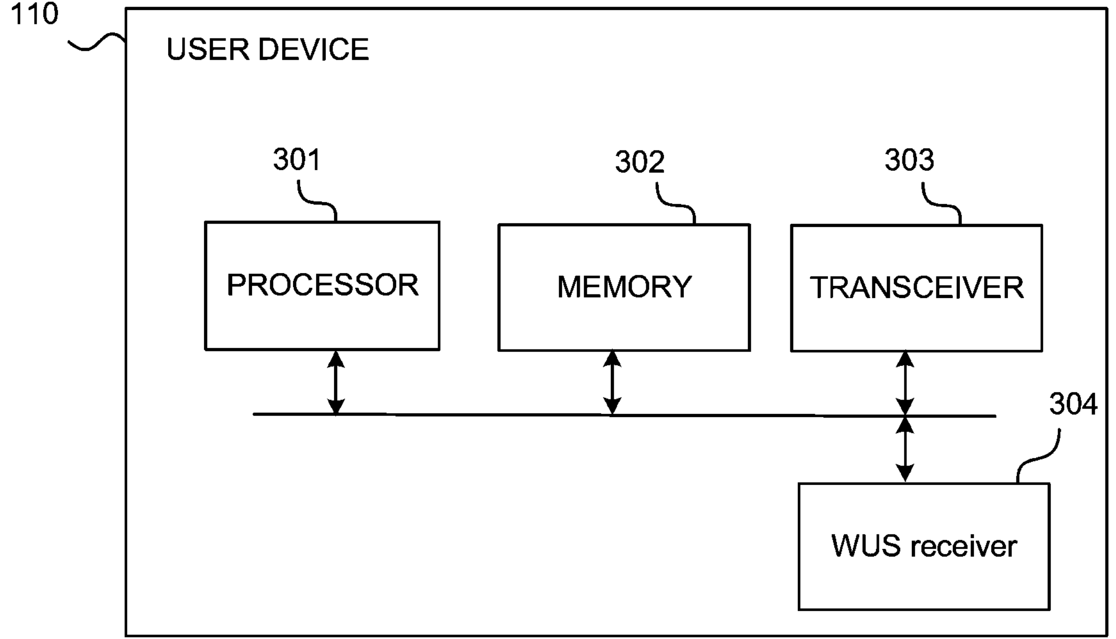
FIG. 3 illustrates simplified block diagrams a user device in accordance with one example embodiment.

FIG. 3 shows a block diagram of a user device 110 in accordance with one example embodiment. In particular, the first user device (e.g., UE1 110-1), and/or the second user device (e.g., UE2 110-2) may be implemented as the user device 110 described in relation to FIG. 3. The user device 110 is intended to communicate with one or more network nodes (e.g., gNBs) in any of the above-described wireless communication networks. The user device 110 may be implemented as any of the above-described UEs.

As shown in FIG. 3, the user device 110 comprises a processor 301, a memory 302, a transceiver 303 (e.g., ordinary NR transceiver), and a WUS receiver 304 (e.g., Low power wake-up receiver (LP-WUS Receiver)). The memory 302 stores processor-executable instructions which, when executed by the processor 301, cause the processor 301 to perform some aspects of the present disclosure, as will be described below in more detail.

It should be noted that the number, arrangement, and interconnection of the constructive elements constituting the user device 110, which are shown in FIG. 3, are not intended to be any limitation of the present disclosure, but merely used to provide a general idea of how the constructive elements may be implemented within the user device 110. For example, the processor may be replaced with several processors, as well as the memory may be replaced with several removable and/or fixed storage devices, depending on particular applications.

Furthermore, in some example embodiments, the transceiver 303 (e.g., ordinary NR transceiver) may be implemented as two individual devices, with one for a receiving operation and another for a transmitting operation. Irrespective of its implementation, the transceiver 303 (e.g., ordinary NR transceiver) is intended to be capable of performing different operations required to perform the data reception and transmission, such, for example, as signal modulation/demodulation, encoding/decoding, etc.

The processor 301 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 302 may be implemented as any combination of one or more of the aforesaid. As an example, the processor 302 may be a combination of two or more microprocessors.

The memory 302 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions stored in the memory 302 may be configured as a computer-executable program code which causes the processor 301 to perform the aspects of the present disclosure. The computer-executable program code for carrying out operations or steps for the aspects of the present disclosure may be written in any combination of one or more programming languages, such as Java, C++, or the like. In some examples, the computer-executable program code may be in the form of a high-level language or in a pre-compiled form and be generated by an interpreter (also pre-stored in the memory 302) on the fly.

The WUS receiver 304 is configured to monitor one or more dedicated communication channel for any one or more WUSs from any one or more network nodes. The WUS receiver 304 is distinct from the transceiver 303 (e.g., ordinary NR transceiver) of the user device 110. When a WUS receiver 304 receives the WUS, the WUS receiver 304 triggers the wake-up of transceiver 303 (e.g., ordinary NR transceiver). The WUS receiver 304 may be a low-power or an ultra-low power receiver. The WUS receiver 304 may be low power in the sense that it consumes significantly less power than the transceiver 303 (e.g., ordinary NR transceiver). The low-power WUS receiver 304 may be operated in an always 'ON' manner. It may be assumed that the low-power WUS receiver 304 can be operated in an always 'ON' manner with very low power consumption, in particular because the WUS may be designed as a simple signal, the low-power WUS receiver 304 may use dedicated hardware for the monitoring of the WUS, and because the low-power WUS receiver 304 may only be able to receive the WUS.

Figure 4:
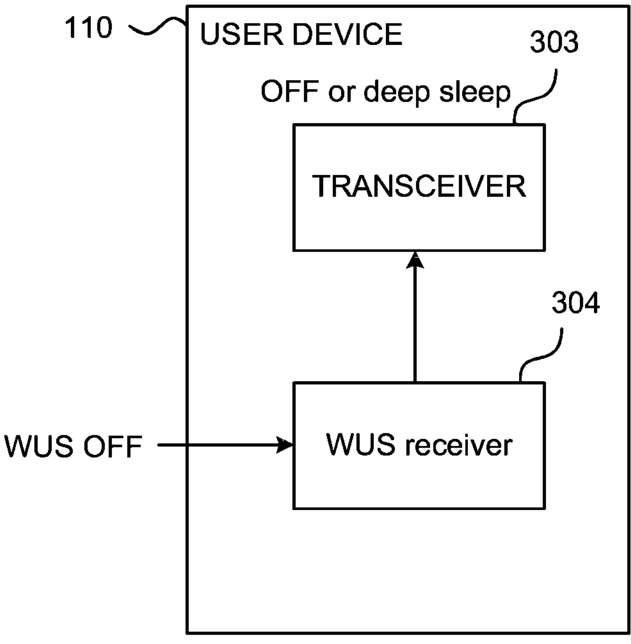
FIGS. 4 and 5 illustrate an example wake-up signaling process at a user device in accordance with one example embodiment.
Figure 5:
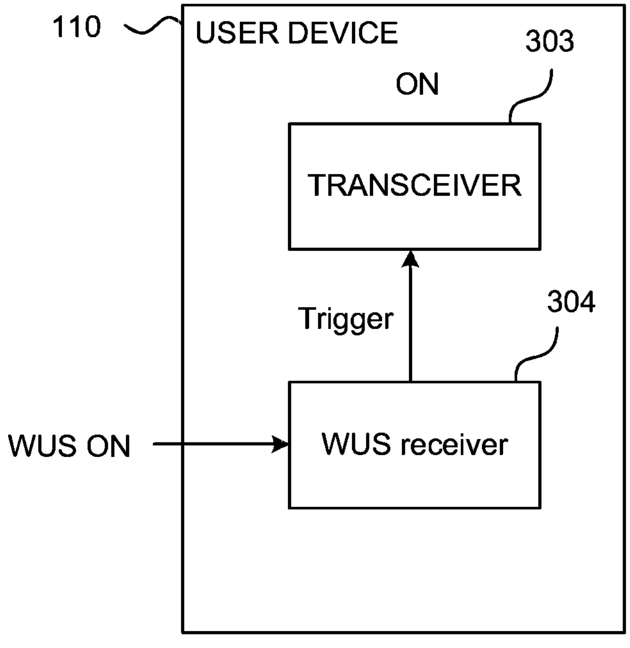

As illustrated by FIGS. 4 and 5, the waking-up procedure may use the WUS receiver 304. The network may trigger the user device 110 to wake-up when needed in an event-driven manner, by transmitting a WUS which is monitored by the dedicated low-power WUS receiver 304 at the user device 110. When the WUS receiver 304 detects a WUS, the WUS receiver 304 can trigger the wake-up of the transceiver 303 (e.g., ordinary NR transceiver) such that communication between user device 110 and the network can start. The rest of the time, the transceiver 303 (e.g., ordinary NR transceiver) may be OFF or kept in a deep sleep mode.

There is a tradeoff between the power consumption and Radio Frequency (RF) sensitivity of the WUS receiver. The WUS receiver sensitivity is usually significantly worse than the ordinary NR transceiver (e.g., included in the transceiver 303) of the user device. For example, according to the 3GPP (see RWS-210168), for the ordinary NR transceiver in NR RRC_IDLE state an RF sensitivity of −100 dBm is associated with an average power consumption of 30-50 mW. Typically, the ordinary NR transceiver can operate at around −120 dBm. As for the WUS receiver, an RF sensitivity of −70/80 dBm is associated with an average power consumption of 7.4 nW. This means 100× power saving with some sensitivity degradation.

As illustrated by FIG. 1, the cell area 130 is the geographic area where a user device 110 can communicate with the network node 10 using the ordinary NR transceiver (e.g., transceiver 303). The WUS coverage area 140 is the geographic area where a user device 110 can receive WUSs from the network node 120 using the WUS receiver 304.

The WUS coverage area 140 is typically smaller than the cell area 130 (e.g., in which (legacy) DCI-based paging is supported). This is due to the assumption that the WUS receiver is less sensitive than the main receiver, and furthermore due to use of different modulation and/or coding and potentially different carrier frequencies for the WUS compared to the DCI-based paging. A user device, for example first user device 110-1, may be inside the cell area 130 of the network node 120 but outside the WUS coverage area 140. Such a device cannot receive the WUS from the network node 120 using the WUS receiver 304.

Some example embodiments extend the WUS coverage area for low power WUS receivers. Some example embodiments ensure a reliable WUS detection in the entire cell area (e.g., 5G legacy paging coverage area). Some example embodiments ensures that user devices in a static or semi-static environment can obtain WUS support. Some example embodiments reduce the complexity requirement for the network to have WUS support in the whole coverage area of the network. Some example embodiments reduce the need for WUS support in all available bands.

As illustrated by FIG. 1, some example embodiments extend the WUS coverage area 140 to a local WUS coverage area 150 outside the WUS coverage area 140. The local WUS coverage area 150 may for example be a local area for static and semi-static devices, such as sensors, video surveillance, actuators, and controllers. The local area may for example be a production facility, an office environment, or any indoor facility.

According to some example embodiments, a user device, for example the second user device (e.g., UE2 110-2), connected to the network, for example via network node 120, acts as local WUS relaying device for other user devices, for example the first user device (e.g., UE1 110-1). The user device acting as WUS relaying device (e.g., UE2 110-2) creates a local WUS coverage area 150. The local WUS coverage area 150 is the geographic area where a user device (e.g., UE1 110-1), can receive a WUS via the user device acting as local WUS relaying device (e.g., UE2 110-2). The user device (e.g., UE2 110-2) acting as local WUS relaying device may or may not be in the WUS coverage area 140.

The user device (e.g., UE2 110-2) acting as WUS relaying device may be configured to transmit one or more WUS beacons. A WUS beacon is a wireless signal that indicates the readiness of the user device (e.g., UE2 110-2) to act as WUS relaying device. It may also indicate the proximity or location of the user device (e.g., UE2 110-2) acting as WUS relaying device. The WUS beacon may also indicate the capabilities and configuration of the user device (e.g., UE2 110-2) acting as WUS relaying device. The user device (e.g., UE2 110-2) acting as WUS relaying device may be configured to repetitively transmit the WUS beacon (e.g., at regular interval).

The user device (e.g., UE2 110-2) acting as WUS relaying device may be configured to transmit the WUS beacon on the same communication band as the WUS.

The beacon may be transmitted with the same broadcasting power (or transmit Power) as the WUS. As such, the coverage area of the beacon is the same (or similar to) the local WUS coverage area of created by the user device (e.g., UE2 110-2) acting as WUS relaying device. The beacon may be used by user devices (e.g., UE1 110-1) to determine if they are in the local WUS coverage area of created by the user device (e.g., UE2 110-2) acting as WUS relaying device. In semi-static scenario, the beacon may be used by the user device (e.g., UE1 110-1) to determine whether it is moving out of the local WUS coverage area.

The beacon may however be distinct from the WUS. In particular, the WUS beacon does not necessarily cause the user device receiving the WUS beacon to wake-up. The WUS may therefore not include the instructions for a user device or a set of user devices either to wake up.

The beacon may be used for synchronization purposes, in particular for time and optionally for frequency synchronization. The beacon may be used to synchronize the user device (e.g., UE1 110-1) requesting WUS support with the user device (e.g., UE2 110-2) acting as WUS relaying device. In that case, the beacon includes synchronization information. The WUS may or may not include the synchronization information. If the WUS does not include the synchronization information, the synchronization information may be included in the beacon.

The user device (e.g., UE2 110-2) acting as WUS relaying device may be a user device dedicated to ensuring WUS coverage and therefore configured to permanently act as a WUS relaying device. The user device (e.g., UE2 110-2) acting as WUS relaying device may alternatively not be dedicated to ensuring WUS coverage and only temporarily or occasionally configured to act as a WUS relaying device.

The user device acting as WUS relaying device (e.g., UE2 110-2) may be configured to generate the WUS and WUS beacon on a dedicated frequency band. The user device requesting WUS support (e.g., UE1 110-1) may be configured to receive signals on the frequency band dedicated to WUS transmission. The frequency band dedicated to WUS transmission may be in the unlicensed spectrum, such as the unlicensed 5 GHz or 6 GHz frequency band. The frequency band dedicated to WUS transmission is either explicitly indicated to the user device (e.g., UE1 110-1) requesting WUS support or is implicitly known to the user device (e.g., UE1 110-1). The frequency band dedicated to WUS transmission may be chosen by the network node (e.g., gNB 120) based on the capabilities of the user device (e.g., UE2 110-2)

acting as WUS relaying device for transmitting WUSs, and the capabilities of the user device (e.g., UE1 110-1) requesting WUS support.

The local WUS coverage 150 may be configured by explicit notification from the user device (e.g., UE2 110-2) acting as WUS relaying device about its WUS capabilities. The user device (e.g., UE2 110-2) may indicate, as a part of its capabilities, that it supports WUS generation, as well as at least one frequency band in which WUS generation is supported.

A first user device (e.g., UE1 110-1) can request WUS support by explicit network signaling. The user device (e.g., UE1 110-1) connects to the network via the network node (e.g., gNB 120), and checks for WUS transmission (e.g., WUS or WUS beacon). If no WUS transmission is detected, the first user device (e.g., UE1 110-1) sends a request for alternative WUS support to the network node (e.g., gNB 120). The request for alternative WUS support may include a WUS capability of the user device (e.g., UE1 110-1) requesting WUS support. In particular, the WUS capability may include at least one frequency bands supported by the first user device (e.g., UE1 110-1) requesting WUS support. Upon receiving the request for alternative WUS support, the network node (e.g., gNB 120) instructs the second user device (e.g., UE2 110-2) to provide WUS support to the first user device (e.g., UE1 110-1). Providing WUS support means acting as WUS relaying device and transmitting WUS received from the network node (e.g., gNB 120) to the first user device (e.g., UE1 110-1).

In some example embodiments, the first user device (e.g., UE1 110-1) does not need to request WUS support, if the second user device (e.g., UE2 110-2) acting as WUS relaying device is a device dedicated to ensuring WUS coverage and therefore configured to permanently act as a WUS relaying device. The first user device (e.g., UE1 110-1) still needs to know on which frequency band the WUS is transmitted. The frequency band dedicated to WUS transmission is either explicitly indicated to the first user device (e.g., UE1 110-1) or is implicitly known to the first user device (e.g., UE1 110-1).

The second user device (e.g., UE2 110-2) is connected to the network (e.g., via network node 120) when receiving the request to provide WUS support. The second user device (e.g., UE2 110-2) may be in connected (e.g., RRC_Connected), inactive (e.g., RRC_inactive), or idle mode (e.g., RRC=Idle), for example DCI based paging or WUS mode. Depending on the mode, there might be longer or shorter delay for the wakeup sequence of the user device requesting WUS support. The second user device (e.g., UE2 110-2) may stay connected to the network (e.g., via network node 120) (e.g., RRC_Connected) after receiving the request to provide WUS support.

After receiving the request to provide WUS support, the second user device (e.g., UE2 110-2) transmits a WUS beacon on the dedicated frequency band. The WUS indicates that the second user device (e.g., UE2 110-2) is acting as WUS relaying device. It may also indicate the proximity or location of the user device (e.g., UE2 110-2) acting as WUS relaying device.

The network node (e.g., gNB 120) instructs the first user device (e.g., UE1 110-1) to search for a WUS transmission (e.g., WUS or WUS beacon) in the frequency band dedicated to WUS transmission. If the first user device (e.g., UE1 110-1) detects a WUS transmission (e.g., either a WUS or a WUS beacon), the first user device (e.g., UE1 110-1) informs the network node (e.g., gNB 120) that the WUS connection is established. The first user device (e.g., UE1 110-1) can go on idle mode and wait for a WUS that will be transmitted by the second user device (e.g., UE2 110-2) acting as WUS relaying device.

When paging the first user device (e.g., UE1 110-1), the network node (e.g., gNB 120) sends a WUS to the second user device (e.g., UE2 110-2). The second user device (e.g., UE2 110-2) acting as WUS relaying device forwards the WUS to the first user device (e.g., UE1 110-1).

Figure 6:
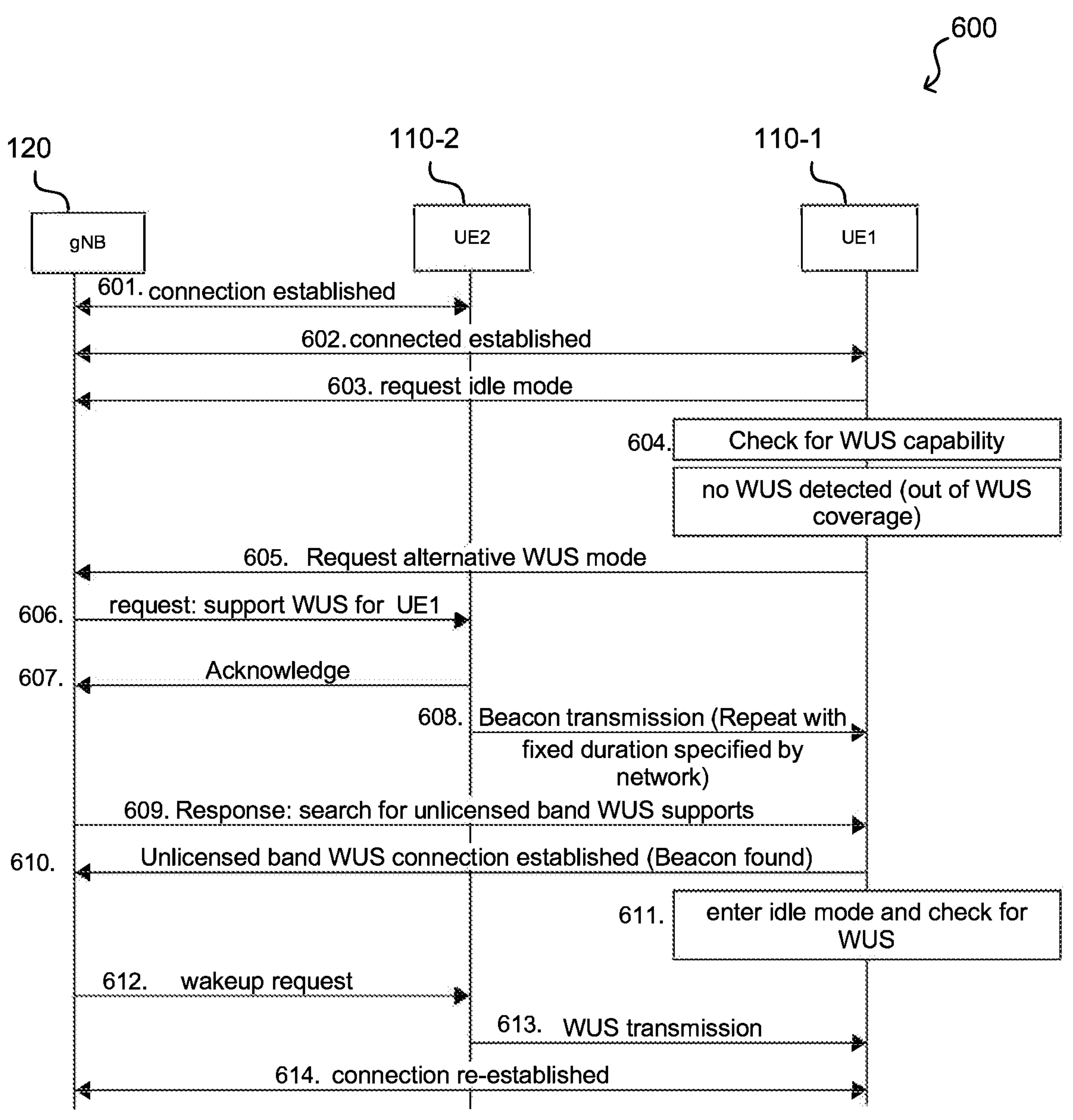
FIG. 6 illustrates a signaling chart of an example method according to some example embodiments of the present disclosure.

FIG. 6 illustrates a signaling diagram illustrating a method 600 in accordance with some example embodiments of the present disclosure. The method 600 may be used for the extension of WUS coverage. Some of the described operations may not be present in all example embodiments and the example embodiments may also comprise additional features/operations described elsewhere in this specification.

Apparatuses, such as the first user device (e.g., UE1 110-1 with reference to FIG. 1), the second user device (e.g., UE2 110-2 with reference to FIG. 1), and the network node device (e.g., gNB 120 with reference to FIG. 1) may be configured to perform the functionalities and operations of the method of FIG. 6. Some of the described operations may not be present in all example embodiments and the example embodiments may also comprise additional features/operations described elsewhere in this specification.

For the purpose of discussion, the method 600 will be described from the perspective of the first user device (e.g., UE1 110-1 with reference to FIG. 1). It would be appreciated that the method 600 may also be implemented at the second user device (e.g., UE2 110-2 with reference to FIG. 1) and the network node device (e.g., gNB 120 with reference to FIG. 1).

At operation 601, a connection is established between the network node (e.g., gNB 120) and the second user device (e.g., UE2 110-2). Prior, during, or after the establishment of the connection, the second user device (e.g., UE2 110-2) may indicate to the network node (e.g., gNB 120) its capability for generating WUS. In particular, the capability for generating WUS may include at least one frequency band (e.g., in the unlicensed spectrum) in which the second user device (e.g., UE2 110-2) can transmit WUS.

At operation 602, a connection is established between the network node (e.g., gNB 120) and the first user device (e.g., UE1 110-1). Prior, during, or after the establishment of the connection, the first user device (e.g., UE1 110-1) may indicate to the network node (e.g., gNB 120) its capability for receiving WUS. In particular, the capability for receiving WUS may include at least one frequency band (e.g., in the unlicensed spectrum) in which the first user device (e.g., UE1 110-1) can receive WUS.

At operation 603, the first user device (e.g., UE1 110-1) sends a request for idle mode to the network node (e.g., gNB 120).

At operation 604, the first user device (e.g., UE1 110-1) checks for WUS capability. This can be done by searching for WUS transmission (e.g., either WUS or WUS beacon). If the first user device (e.g., UE1 110-1) detects WUS transmission (e.g., either WUS or WUS beacon) from another user device (e.g., UE2 110-2) acting as WUS relaying device, the first user device (e.g., UE1 110-1) replies to the user device (e.g., UE2 110-2) acting as WUS relaying device. The user device (e.g., UE2 110-2) acting as WUS relaying device may then complete a hand-shake with the network node (e.g., gNB 120). Alternatively, if the user device (e.g., UE2 110-2) acts as WUS relaying device permanently, there may be no need for further hand-shake.

At operation 605, if the first user device (e.g., UE1 110-1) does not detect any WUS transmission (e.g., neither WUS nor WUS beacon) (e.g., during a preconfigured time), this means that the first user device (e.g., UE1 110-1) is out of WUS coverage area. The first user device (e.g., UE1 110-1) sends a request to the network node (e.g., gNB 120) for alternative WUS support. The request may include the capability of the first user device (e.g., UE1 110-1) for receiving WUS. In particular, the capability for receiving WUS may include at least one frequency band (e.g., in the unlicensed spectrum) in which the first user device (e.g., UE1 110-1) can receive WUS.

At operation 606, the network node (e.g., gNB 120) sends a request to the second user device (e.g., UE2 110-2) to provide WUS support to the first user device (e.g., UE1 110-1). Providing WUS support means acting as a WUS relaying device. The request may include the frequency band at which WUS transmission (e.g., WUS and/or WUS beacon) should be executed. The frequency band may be a frequency band that is dedicated to WUS transmission. In particular, the frequency band dedicated to WUS transmission may be in the unlicensed spectrum.

At operation 607, the second user device (e.g., UE2 110-2) may acknowledge the request.

At operation 608, the second user device (e.g., UE2 110-2) transmits a WUS beacon. The WUS beacon may be transmitted on the frequency band indicated in the request send by the network node (e.g., gNB 120), or in a frequency band implicitly dedicated to WUS transmission, or in a frequency band previously agreed with the network node (e.g., gNB 120). The transmission of the WUS beacon may be repeated with a fixed duration that may be specified in the request.

At operation 609, the network node (e.g., gNB 120) instructs the first user device (e.g., UE1 110-1) to search for a WUS beacon in the frequency band used by the second user device (e.g., UE2 110-2) to transmit the WUS beacon. The frequency band may be included in the message sent to the first user device (e.g., UE1 110-1) or previously known to the first user device (e.g., UE1 110-1).

At operation 610, upon detecting the WUS beacon, the first user device (e.g., UE1 110-1) indicates to the network node (e.g., gNB 120) that the WUS beacon has been found and that the WUS connection is established.

At operation 611, the first user device (e.g., UE1 110-1) enters idle mode (e.g., Low-Power WUS idle mode) and waits for a WUS that will be transmitted by the second user device (e.g., UE2 110-2) acting as WUS relaying device.

The wake-up sequence may be triggered as follows.

At operation 612, the network node (e.g., gNB 120) sends a WUS for the first user device (e.g., UE1 110-1) to the second user device (e.g., UE2 110-2).

At operation 613, the second user device (e.g., UE2 110-2) forwards the WUS to the first user device (e.g., UE1 110-1).

At operation 614, upon detecting the WUS, the first user device (e.g., UE1 110-1) wakes-up. The first user device (e.g., UE1 110-1) may enter DCI mode, read DCI information and act accordingly. The first user device (e.g., UE1 110-1) may re-established connection with the network node (e.g., gNB 120) and enter RRC_connected mode.

Figure 7:
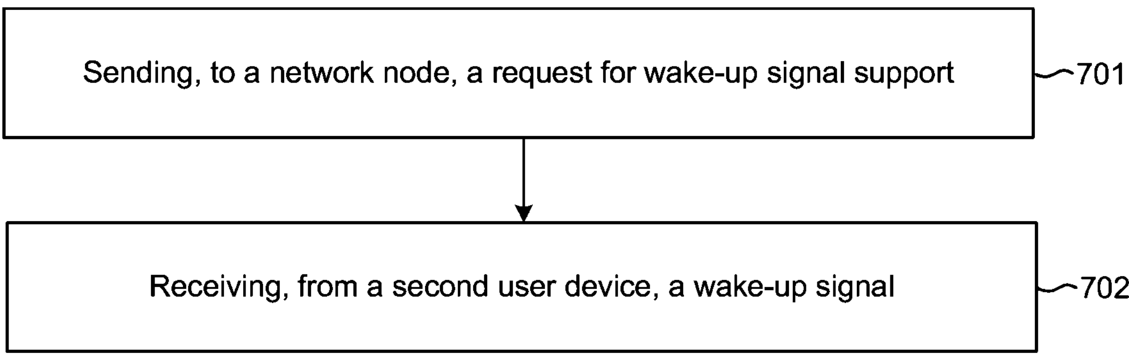
FIG. 7 illustrates a flowchart of an example method according to some example embodiments of the present disclosure.

FIG. 7 illustrates a flowchart of an example method in accordance with some example embodiments of the present disclosure. For the purpose of discussion, the method will be described from the perspective of the first user device (e.g., UE1 110-1 with reference to FIG. 1).

At operation 701, the method comprises sending, to a network node, a request for wake-up signal support.

At operation 702, the method comprises receiving, from a second user device, a wake-up signal.

Figure 8:
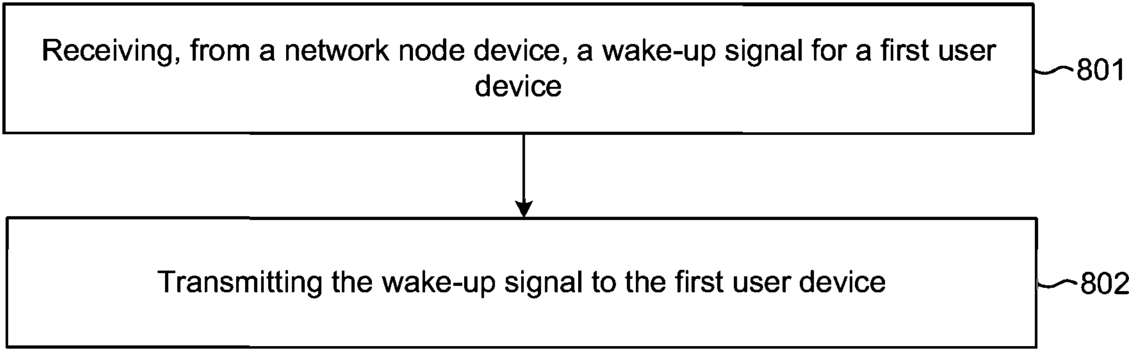
FIG. 8 illustrates a flowchart of an example method according to some example embodiments of the present disclosure.

FIG. 8 illustrates a flowchart of an example method in accordance with some example embodiments of the present disclosure. For the purpose of discussion, the method will be described from the perspective of the second user device (e.g., UE2 110-2 with reference to FIG. 1).

At operation 801, the method comprises receiving, from a network node device, a wake-up signal for a first user device.

At operation 802, the method comprises transmitting the wake-up signal to the first user device.

Figure 9:
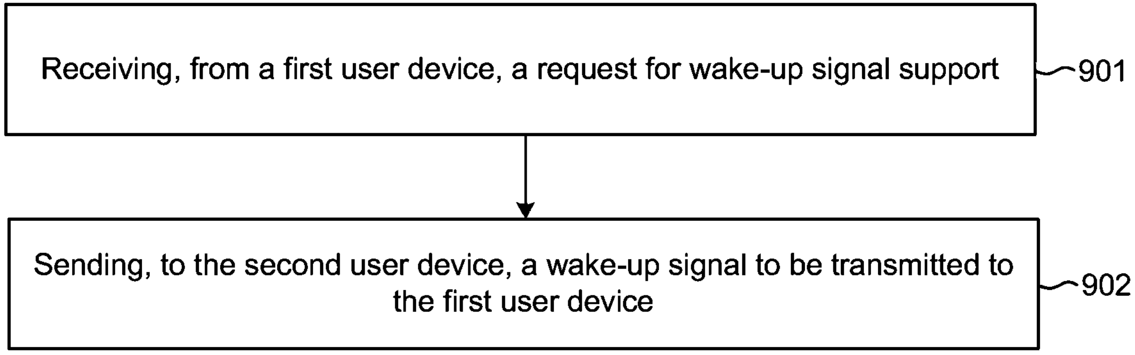
FIG. 9 illustrates a flowchart of an example method according to some example embodiments of the present disclosure.

FIG. 9 illustrates a flowchart of an example method 400 in accordance with some example embodiments of the present disclosure. For the purpose of discussion, the method 900 will be described from the perspective of the network node device (e.g., gNB 120 with reference to FIG. 1).

At operation 901, the method comprises receiving, from a first user device, a request for wake-up signal support.

At operation 902, the method comprises sending, to the second user device, a wake-up signal to be transmitted to the first user device.

Some terminology used herein may follow the naming scheme of 4G or 5G technology in its current form. However, this terminology should not be considered limiting, and the terminology may change over time. Thus, the following discussion regarding any example embodiment may also apply to other technologies.

The functionality described herein can be performed, at least in part, by one or more computer program product components such as software components. According to an example embodiment, the network node device 100 comprises a processor configured by the program code when executed to execute the example embodiments of the operations and functionality described. Alternatively, or in addition, the functionality described herein can be performed, at least in part, by one or more hardware logic com-ponents. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any example embodiment may be combined with another example embodiment unless explicitly disallowed.

Although the subject matter has been de-scribed in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one ex-ample embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

What is claimed is:

1. A first User Equipment (UE) comprising:
- a transceiver;
- a dedicated low-power wake-up signal receiver that is distinct from the transceiver and configured to monitor in an always-ON manner one or more dedicated communication channels for wake-up signals;
- at least one processor; and
- at least one memory including computer program code that, when executed by the at least one processor, cause the first UE to perform operations comprising:
  - establishing a connection with a network node;
  - indicating, to the network node, a wake-up signal receiving capability of the first UE that includes at least one frequency band in which the first UE can receive wake-up signals;
  - sending, to the network node, a first request to enter an idle mode;
  - in response to sending the first request, checking for a wake-up signal capability from the network node by searching for a wake-up signal transmission comprising either a wake-up signal or a wake-up signal beacon;
  - based on a determination that no wake-up signal capability is detected from the network node during a preconfigured time period such that neither the wake-up signal nor the wake-up signal beacon is detected, sending a second request for alternative wake-up signal support to the network node, wherein the second request includes an indication of the wake-up signal capability of the first UE, the wake-up signal capability comprising at least one frequency band in which the first UE is configured to receive at least one wake-up signal;
- in response to the second request, receiving, from the network node, an instruction to search for a wake-up signal beacon on a dedicated wake-up signal transmission band of a second UE in an unlicensed spectrum, the second UE acting as a wake-up signal relay device, wherein the instruction includes an indication of the dedicated wake-up signal transmission band on which the wake-up signal beacon is to be searched, wherein the unlicensed spectrum is in one of a 5 GHz frequency band or a 6 GHz frequency band;
- detecting the wake-up signal beacon from the second UE, wherein the wake-up signal beacon is transmitted repetitively by the second UE at a regular interval, for a fixed duration specified by the network node, the wake-up signal beacon indicating a readiness of the second UE to provide the alternative wake-up signal support and including synchronization information for at least time synchronization;
- based on detecting the wake-up signal beacon from the second UE, sending an indication to the network node that the wake-up signal beacon has been found and that a wake-up signal connection is established, and entering a Low-Power wake-up signal idle mode in which the transceiver is OFF or in a deep sleep mode;
- receiving, from the network node via the dedicated low-power wake-up signal receiver of the first UE during operation in the Low-Power wake-up signal idle mode, a wake-up signal that was sent by the network node to the second UE and forwarded by the second UE to the first UE; and
- in response to receiving the wake-up signal, triggering, by the dedicated low-power wake-up signal receiver, the transceiver to wake-up and re-establish a connection with the network node by entering a DCI mode to read downlink control information and acting according to the downlink control information.

2. A system comprising:
- a first User Equipment (UE) comprising:
- a transceiver;
- a dedicated low-power wake-up signal receiver that is distinct from the transceiver and configured to monitor in an always-ON manner one or more dedicated communication channels for wake-up signals;
- at least one processor; and
- at least one memory including computer program code that, when executed by the at least one processor, cause the first UE to perform operations comprising:
  - establishing a connection with a network node;
  - indicating, to the network node, a wake-up signal receiving capability of the first UE that includes at least one frequency band in which the first UE can receive wake-up signals;
  - sending, to the network node, a first request to enter an idle mode;
  - in response to sending the first request, checking for a wake-up signal capability from the network node by searching for a wake-up signal transmission comprising either a wake-up signal or a wake-up signal beacon;
  - based on a determination that no wake-up signal capability is detected from the network node during a preconfigured time period such that neither the wake-up signal nor the wake-up signal beacon is detected, sending a second request for alternative wake-up signal support to the network node, wherein the second request includes an indication of the wake-up signal capability of the first UE, the wake-up signal capability comprising at least one frequency band in which the first UE is configured to receive at least one wake-up signal;
  - in response to the second request, receiving, from the network node, an instruction to search for a wake-up signal beacon on a dedicated wake-up signal transmission band of a second UE in an unlicensed spectrum, the second UE acting as a wake-up signal relay device, wherein the instruction includes an indication of the dedicated wake-up signal transmission band on which the wake-up signal beacon is to be searched, wherein the unlicensed spectrum is in one of a 5 GHz frequency band or a 6 GHz frequency band;

detecting the wake-up signal beacon from the second UE, wherein the wake-up signal beacon is transmitted repetitively by the second UE at a regular interval, for a fixed duration specified by the network node, the wake-up signal beacon indicating a readiness of the second UE to provide the alternative wake-up signal support and including synchronization information for at least time synchronization;

based on detecting the wake-up signal beacon from the second UE, sending an indication to the network node that the wake-up signal beacon has been found and that a wake-up signal connection is established, and entering a Low-Power wake-up signal idle mode in which the transceiver is OFF or in a deep sleep mode;

receiving, from the network node via the dedicated low-power wake-up signal receiver of the first UE during operation in the Low-Power wake-up signal idle mode, a wake-up signal that was sent by the network node to the second UE and forwarded by the second UE to the first UE; and in response to receiving the wake-up signal, triggering, by the dedicated low-power wake-up signal receiver, the transceiver to wake-up and re-establish a connection with the network node by entering a DCI mode to read downlink control information and acting according to the downlink control information.

* * * * *